United States Patent
Hill et al.

(10) Patent No.: US 6,592,796 B2
(45) Date of Patent: Jul. 15, 2003

(54) METHOD OF MANUFACTURING LINEAR SMALL TUBULAR ARTICLES

(76) Inventors: Colin Hill, Berrag Farm, Sandygate Isle of Man (GB), IM7 3BS; Ian Cookson, Anvil Cottage Wrinehill Road, Wybunbury, Cheshire (GB), CW5 7NU ( * ) Notice: Subject to any disclaimer, the term of this patent is extended or adjusted under 35 U.S.C. 154(b) by 174 days.

(21) Appl. No.: 09/800,289

(22) Filed: Mar. 6, 2001

(65) Prior Publication Data

US 2002/0125610 A1 Sep. 12, 2002

(51) Int. Cl.[7] .............................................. B29C 70/44
(52) U.S. Cl. .................. 264/257; 264/231; 264/258; 264/291; 264/349; 156/86
(58) Field of Search ................. 264/510, 512, 264/313, 231, 317, 324, 257, 258, 291; 156/84, 86

(56) References Cited

U.S. PATENT DOCUMENTS

| | | | | |
|---|---|---|---|---|
| 3,607,495 A | * | 9/1971 | Davis, Jr. | 156/84 |
| 3,953,270 A | * | 4/1976 | Ford | 156/80 |
| 5,002,476 A | * | 3/1991 | Kerr | 425/174.004 |
| 5,035,764 A | * | 7/1991 | Blake | 156/357 |
| 5,599,612 A | * | 2/1997 | Muraki et al. | 442/60 |
| 5,626,529 A | * | 5/1997 | Roy | 473/319 |
| 5,888,436 A | * | 3/1999 | Keith et al. | 264/103 |
| 6,006,643 A | * | 12/1999 | Hirukawa | 87/34 |
| 6,261,500 B1 | * | 7/2001 | Park et al. | 264/258 |

* cited by examiner

Primary Examiner—Stefan Staicovici
(74) Attorney, Agent, or Firm—John Lezdey

(57) ABSTRACT

A method of manufacturing linear small tubular articles to provide tubular medical articles for minimal invasive percutaneous introduction into a mammalian body. The method involves forming layers on a wire mandrel and covering with a heat shrinkable tape.

19 Claims, 2 Drawing Sheets

METHOD OF MANUFACTURING LINEAR SMALL TUBULAR ARTICLES

BACKGROUND OF THE INVENTION

1. Field of the Invention

The invention relates to a process of producing linear, small diameter, smooth surface thin wall tubular polymeric composite articles. Also, the invention relates to tubular medical articles and a process for their manufacture.

2. Description of the Prior Art

Conventional commercially available tubular medical articles of small diameter and thin wall dimensions such as hypodermic needles are manufactured from metals e.g. stainless steel. However, the metals interfere with certain diagnostic procedures such as X-rays, magnetic resonance imaging (MRI), sonograms, inter alia. To overcome this problem, plastic has been suggested as a material of construction. While the plastic material can overcome some of the deficiencies of the metal articles when used with the various diagnostic procedures, generally its mechanical properties do not approach the mechanical and chemical properties inherent in metals.

U.S. Pat. No. 5,603,696 issued to Williams, et al. discloses molded tubular medical articles produced from specific blends of syndiotatic and isotactic crystalline polypropylene, which are produced by a molding process. The invention is directed to articles having a wall thickness of about 2 mm or less with a high clarity requirement to achieve a see-through capacity. However, the patented medical articles do not possess the mechanical properties necessary for some medical procedure. For example, they would not have the stiffness required for use as hypodermic needles.

Therefore, there is a need for tubular medical articles of small diameter and thin wall dimensions which have substantially improved mechanical properties and which can be produced in a process, which is efficient, economical and reproducible.

SUMMARY OF THE INVENTION

The present invention provides linear small diameter, thin wall, and tubular articles having millimeter dimensions, particularly medical articles, which overcome the deficiencies of both metallic and plastic articles of the prior art. More particularly the present invention is directed to a process for making small diameter polymeric composite tubes having thin walls more efficiently with reproducible results.

The process of this invention, which involves a series of simple and economical steps yields reinforced polymeric composite tubular articles having high dimensional stability, a uniform and smooth surface, including surface slipperiness, abrasion resistance, high mechanical strength and corrosion resistance.

In its broadest aspect the process comprises the steps of:
a) Subjecting a flexible mandrel to a tensioning means for providing linearity along its longitudinal axis;
b) Applying a prepreg around the tensioned mandrel;
c) Releasing the tension on the mandrel;
d) Covering the prepreg coated mandrel with a compression sleeve to form an assembly;
e) Shrinking the compression sleeve the assembly;
f) Applying an effective pressure for consolidating the prepreg around the assembly;
g) Applying tension for maintaining the linearity of the assembly to the mandrel;
h) Curing the prepreg under tension to form a tubular composite around the mandrel;
i) Releasing the tension on the mandrel;
j) Withdrawing the mandrel from the cured prepreg tubular composite; and
k) Removing the compression sleeves to yield a linear small diameter, smooth surface, thin wall tubular composite article.

The invention includes tubular polymeric composite articles made by the above-described process and particularly the production of hypodermic needles. The tubular composite articles of this invention have excellent tensile strength, modulus, and impact resistance.

It is, therefore, a primary object of this invention is to provide a process for the production a linear, small diameter, smooth surface, thin wall composite polymeric tubular article.

It is another object of this invention to provide tubular medical articles for minimally invasive percutaneous introduction into a mammalian body, which does not interfere with diagnostic medical procedures.

It is a further object of this invention to provide tubular medical articles for introducing or removing fluids from a mammalian body.

Yet another object of this invention is to provide a process for preparing tubular small diameter composites useful as hypodermic needles.

These and other objects, features and advantages will become apparent from the following description of the preferred embodiments, accompanying drawings and claims.

DETAILED DESCRIPTION OF THE PREFERRED EMBODIMENTS

In accordance with this invention linear, small diameter, thin wall tubular articles having millimeter dimensions are produced. While the present invention is directed primarily to the production of tubular medical articles, the articles may also be used in various microprocesses since they are chemically inert and have exceptional mechanical properties for their size. The tubular medical articles include hypodermic needles, stents, blood collection tubes, inter alia.

Figure 1:
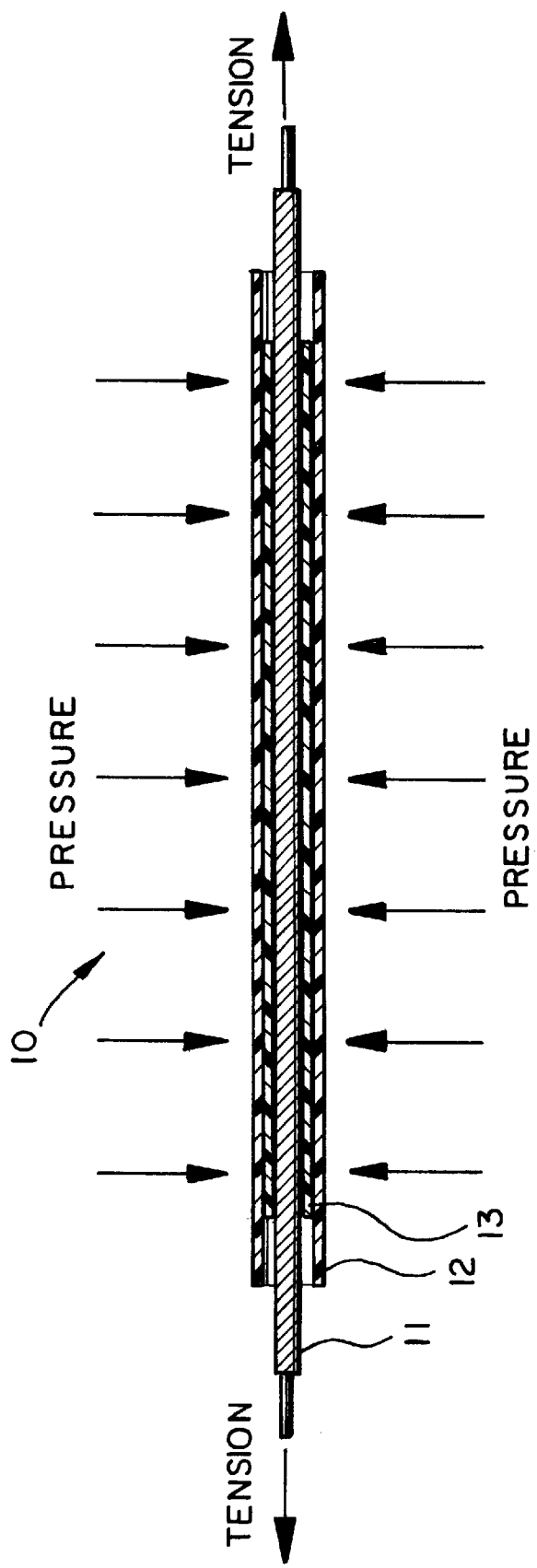
FIG. 1 is a side elevational view partially in cross section illustrating the critical step of curing the prepreg under pressure while simultaneously maintaining the mandrel under tension in the preparation of linear, small diameter smooth surface thin wall tubular polymeric composite in accordance with the present invention.
Figure 2:
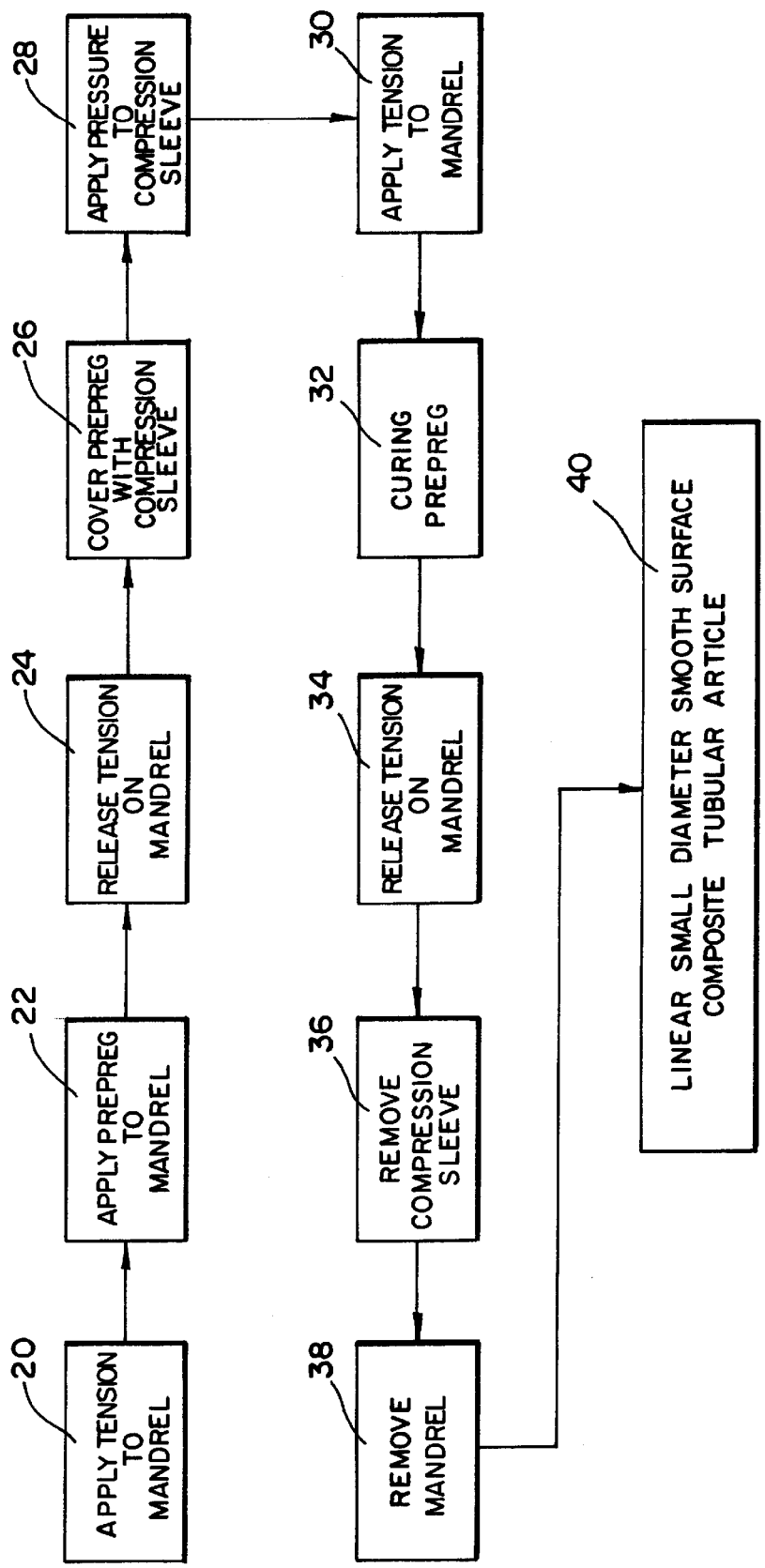
FIG. 2 schematically illustrates a flow diagram for preparing the linear, small diameter, thin wall tubular polymeric composite articles in accordance with the present invention.

Referring to FIG. 1, which illustrates the components of a typical procured assembly for producing the tubular article of the invention. FIG. 1 shows a mandrel (e.g., a wire) or predetermined thickness covered with an adherent 11, a prepreg layer 13 and overlapped with a compression sleeve 12. As illustrated in FIG. 1, and in the process flow diagram of FIG. 2 tension is applied by tensioning means for providing linearity (i.e., straightness) to the wire along its longitudinal axis. The tension is maintained while the prepreg strip is applied to the mandrel. A compression sleeve is placed over the prepreg in envelop the coated wire to form an assembly of coated wire-uncured prepreg-compression sleeve. The sleeve is shrunk to remove any air trapped within the sleeve and to afford a tighter fit around the prepreg coated wire. An effective pressure for consolidating the prepreg strip is applied to the compression sleeve. Curing the prepreg strip forms a tubular composite around the wire. The pressure and tension are released and the wire is withdrawn to produce a linear, small diameter, smoother surface, thin wall tubular polymeric composite article.

The mandrel may be a flexible metal of small diameter ranging from 0.5 to 3.0 mm internal diameter. Aluminum and copper are the metals of choice since they are economical, readily available in many thicknesses and are disposable and recyclable. Preferably, these metals are in the form of a wire covered with an adherent (release agent). Adherents such as waxes, aluminum, searate, stearomides, silicone polymers and fluorocarbon polymers may be applied to the metal surface before the application of the prepreg. The use of adherents eases the removal of the mandrel from the tubular article after the prepreg cure. In this regard it is preferred to have the metal pre-coated such as a wire coated with tetrafluoroethylene.

The prepreg is a composition comprising mixtures of prepolymer and curing catalyst impregnated with a reinforcing material. Broadly any of the know thermoset of thermoplastic polymer systems may be used as the polymer matrix in the finished polymeric composite article.

The addition of a catalyst may be added to cause the polymerization of the prepolymers. The types and amounts of catalyst to be used with specific prepolymer systems are within the knowledge and scope of polymer chemists.

The reinforcement materials useful in forming the prepreg are fibers such as carbon fibers, aramid fibers, nylon fibers and glass fiber. The carbon fibers in graphite form are preferred for imparting the best overall mechanical properties for the purpose of the invention. It is also preferred that the fibers are oriented in a unidirectional manner along the longitudinal axis of the final composition throughout the polymer matrix.

The reinforcement materials may be added to the prepolymer in amounts from between about 0 to 10 weight percent of the final composite composition.

As will be the case with all the components involved, the amount used will be determined somewhat by the properties desired in the cured composition, which in turn, will be determined by the particular application involved, i.e., whether the final composite composition is a hypodermic needle or a composition used as transfer tubes in biological or chemical synthesis reactions.

The compression sleeve can be either a heat shrinkable polymer or a non-shrinking elastomer. Case of an elastomeric sleeve, external fluid or air pressure is used to collapse the sleeve around the uncured prepreg coated mandrel. The compression sleeve acts as a pressure transfer medium and helps consolidate the uncured prepreg uniformly around the mandrel. Exemplary of the heat shrinkable polymers that can be used in the practice of the present invention includes, polyolefins, such as polyethylene and polypropylene, chlorinated and sulfonated polyethylene polymers and polyesters such as polyethylene glycol terephthalate. Suitable elastomers polymeric include neoprene, butyl rubber, styrene-butadiene rubber, nitrile rubber polyvinylidene halides and copolymers of polyvinylidene halides.

Thermoset polymers are extensively cross-linked polymers upon curing, which do not significantly soften upon heating. Typically thermoset polymers are cured causing cross-linking forming a final composite product. The curing may be any type of curing which causes cross linking, e.g. free radical catalysts, humidity, heat, radiation or air curing. Thermoset polymer systems may include a polymer and/or prepolymer. The systems also may include additional agent, which enhance the cross linking process such as catalysts. Examples of thermoset polymers include the following:

Phenol-formaldehyde

Melamine-formaldehyde

Urea-formaldehyde

Polyurethane

Unsaturated polyester

Epoxy

Phenolic aniline

Furan

Polyester

Polyurethane

Polyphenylene sulfide

Polyamide

Silicone

Polyacrylate

Polymethylacrylate

Novolac

Phenolic

Alkyd

Aramid

The thermoset polymer systems may incorporate a suitable catalyst selected from free radical, Natta-Ziegler, Lewis acid, Friedel-Crafts or a photo initiator and sensitizers for radiation initiated curing.

More particularly among the thermoset polymer systems epoxy resins, phenolic resins, aramid Polyamide and Novolac resins are preferred. Most preferred are epoxy resins, which are particularly suited for the production of hypodermic needles because of their inertness to chemical attack especially from biological fluids. Particularly suitable epoxy resins are those derived from diglycidyl ether of bisphenol with the appropriate modifiers and curing agents. However, other epoxy resins are those derived from diglycidyl ether of bisphenol with the appropriate modifiers and curing agents. However, other epoxy resins can also be used such as diglycidyl ethers of resorcinol, dihydroxy dephenyl, hydroquinone, novolacs, etc. These can be modified by the addition of modifying resins. These preferably amine resins and appropriate curing agents and solvents. Certain materials can be used to serve both as a solvent for the resin and also to participate in the curing reaction such as liquid amines. The epoxy resins are cured by many types of materials, including polyamines, polyamides, polysulfides, urea- and phenol-formaldehyde, and acids or acid anhydride, through coupling or condensation reactions.

Thermoplastic polymers are materials, which soften upon heating and harden upon cooling. The softening/hardening cycles may be repeated many times.

Examples of thermoplastic polymers are the following:

Polyethylene

Polypropylene

Polystyrene

Polyvinyl chloride

Polyvinyl alcohol

Polytetrafluoroethylene

Copolymer of poly (tetrafluoroethylen-ethylene)
Polymethyl methacrylate
Polymethyl methacrylate copolymers
Copolymer of poly (methylacrylate-acrylonitrile)
Polybutadidne
Polyoxymethylene
Polymethylene terephalate
Polycarbonate
Poly e-caprolactam
Polyhexamethylene adipamide
Polysulfane
Cellulose acetate
Cellulose acetobutyrate
Cellulose
Polyisoprene
Polychloroprene
Copolymer of poly (isobutene-isoprene)
Bromo butyl rubber
Chlorosulfonated polysthylene
Polyethyl acrylate
Copolymer of poly (ethylene-vinyl acetate)
Nitrile rubber
Copolymer of poly(ethylene-propylene)
Polyurethane rubber
Polysulfide
Silicone rubber
Polyvinyl butyrate
Polyvinyl fluoride
Polyvinylidene fluoride
Polyester
Polyacetal
Polyamide
Polysulfone
Polyethylene oxide
Copolymer of poly (styrene-butadiene)
Copolymer of poly (styrene-butadiene-acrylonitrile)

It will be readily appreciated b those skilled in the art that such catalysts will not be incorporated in any polymer system whether thermoplastic or thermoset where such may be cured by heat alone.

Whenever used in this specification the terms set forth above have the following definitions:

"Assembly" means an uncured prepreg composition over lapped with a compression sleeve.

"Composite" means a cured prepolymer impregnated with a reinforcing material.

"Matrix polymer" means a thermoplastic or thermoset prepolymer in which the reinforcing material may be dispersed.

"Prepolymer" means a resin monomer, co-monomer, oligomer or other molecular subanite capable of being polymerized.

"Prepreg" means a composition comprising a prepolymer and an appropriate catalyst mixture if necessary with a reinforcing material.

EXAMPLE

A rectangular sheet of an uncured unidirectional carbon fiber/epoxy prepreg of 120 denier and 135 g areal film weight is cut to a needle length of 100 mm then cut into narrow strips having a width according to the following formula:

$$W=2\pi d$$

Wherein w=width and d=diameter of the tubular article.

A length of copper wire covered with a polytetrafluoroethylene film is cut 60 mm longer than the prepreg length. The cut wire is placed on a first or bottom platen. Tension is applied by tensioning means for providing linearity (straightening) to the wire along its longitudinal axis. Tensioning means can be a fixed and moveable clamp or two moveable clamps. After the wire is straightened, it is secured to the first platen surface. An edge of the prepreg strip having the dimensions, as arrived above, is placed lengthwise and in contact with the length of the wire. A second or top moveable platen is positioned above and in contact with the edge of the prepreg strip. Under a slight pressure, the second platen is moved parallel to the bottom platen to wrap the remaining portion of the prepreg strip completely around the wire. The top platen is then removed and a compression sleeve of a polyethylene film is placed around the uncured prepreg coated wire, an effective amount of heat for shrinking and compressing the sleeve around the prepreg to form an assembly.

The exposed wire ends of the mandrel within so-formed assembly were placed in a jig comprising one fixed and one moveable clamp. An effective degree of tension for maintaining the linearity of the mandrel is applied by the moveable clamp controlled by a horizontally disposed screw adjustment.

The jig was placed in an oven maintained at about 120° C. until the carbon fiber reinforced epoxy prepreg was cured. After cooling the cured composite was removed from the jig, the compression sleeve and the wire were removed. A linear small diameter, smoother surface, thin wall open-end tubular composite was formed.

Heat curing under tension overcomes the linear thermal expansion of the wire to maintain straightness of the tubular composite.

The production of non-metallic hypodermic needles is a precise and detailed practice because at small diameters (i.e., less than 3 mm) it is difficult to maintain linearity or straightness of the mandrel. Consequently, the resulting needle article has the same deficiency. In the course of the development of this invention, a tubular article was made by wrapping uncured composite material around a rigid mandrel, then over wrapping with a shrink tape, shrinking the tape and curing the composite material to form the tube without tensioning the mandrel.

It was found that during the tape-wrapping step, the radial tension when applying the tape distorted the mandrel causing the resulting tubes to be misaligned. Further, the tape leaves a helical witness lines on the tube surface. In addition, the adhesion forces developed during the curing process make the extraction of the mandrel difficult and the resulting article is damaged and off-specification.

COMPARATIVE EXAMPLE

A narrow tape of the same prepreg composite of Example 1 having a width of 1 mm was wrapped on a bias around a rigid steel mandrel treated with a polytetrafluoroethylene spray as a release agent. A shrink tape of polyethylene was wrapped over the prepreg tape. An effective amount of heat was applied to shrink the tape around the prepreg to form an assembly. The assembly was cured in an oven maintained at about 120° C. When the shrink tape was removed, a helical witness line remained in the cured prepreg surface. Then the steel mandrel line is extracted but the straightness of tubular article was distorted. Also the tubular article produced did not have a smooth surface such as produced in Example 1.

While preferred embodiments of the various aspects of the invention have been described in detail, those of ordinary skill will recognize modifications thereof still falling within the spirit and scope of the inventive concepts.

The embodiments of the invention in which an exclusive property or privilege is desired, is defined in the following claims.

What is claimed is:

1. A process for the production of a hypodermic needle having an internal diameter of 0.5 to 3.0 mm comprising the steps of:
    a. Subjecting a flexible wire mandrel having a diameter of 0.5 to 3.0 mm to a tensioning means for providing linearity along its longitudinal axis;
    b. Applying a prepreg comprising fibers around the tensioned mandrel so that the fibers are oriented in a unidirectional means along the longitudinal axis;
    c. Releasing the tension on said mandrel;
    d. Covering the prepreg coated mandrel with a compression sleeve;
    e. Compressing said sleeve to form an assembly;
    f. Applying an effective pressure for consolidating the prepreg around said mandrel;
    g. Applying tension for maintaining the linearity of said assembly to said mandrel;
    h. Maintaining said tension on said mandrel;
    i. Releasing the tension on said mandrel;
    j. Withdrawing the mandrel; and,
    k. Removing the compression sleeve to yield the hypodermic needle.

2. The process according to claim 1 wherein said flexible mandrel is a metal wire selected from the group consisting of aluminum, copper, steel and stainless steel.

3. The process according to claim 2 wherein said flexible mandrel is coated with an adherent.

4. The process according to claim 3 wherein said adherent is selected from the group consisting of wax, stearamide, silicone polymers and fluorocarbon polymers.

5. The process according to claim 4 wherein said flexible wire mandrel is a copper wire coated with polytetrafluoroethylene.

6. The process according to claim 1 wherein the prepreg comprises a matrix polymer selected from the group consisting of thermosetting polymers, thermoplastic polymers and mixtures thereof and the reinforcing material is a reinforcing fiber.

7. The process according to claim 6 wherein the thermosetting polymers are selected from the group consisting of epoxy, phenolic, polyimide novolac and aramid polymers.

8. The process according to claim 7 wherein the epoxy polymer is at least one member selected from the group consisting of bisphenol epoxy resins and novolac epoxy resins.

9. The process according to claim 6 wherein said reinforcing material is selected from the group consisting of acrylic fibers, aramid fibers, carbon fibers, glass fibers, nylon fibers, polyester fibers, vinyl halide fibers and vinylidene halide fibers.

10. The process according to claim 8 wherein an epoxy resin matrix is impregnated with carbon fibers.

11. The process according to claim 10 wherein said carbon fibers are graphite fibers, which are impregnated in a unidirectional manner.

12. The process according to claim 1 wherein said compression sleeve is a heat shrinkable synthetic polymer or an elastomer.

13. The process according to claim 12 wherein said heat shrinkable synthetic polymer is selected from the group consisting of polyvinyl alcohol, polyvinyl chloride, polyvinyl chloride copolymers, polyvinylidene chloride, polyvinylidene chloride copolymers, polyolefin polymers and polyesters.

14. The process according to claim 13 wherein said polyolefin is polyethylene or polypropylene.

15. The process according to claim 12 wherein step e) is conducted by heating.

16. The process according to claim 12 wherein said elastomer is selected from the group consisting of acrylic polymer butyl rubber, neoprene, mitrile rubber, polysulfides, silicone polymers and styrene-butadine rubber.

17. The process according to claim 16 wherein step e) is conducted by external fluid or air pressure.

18. The process according to claim 1 including the step wherein said mandrel is coated with an adherent prior to step a).

19. A process for the production of a linear, smooth surface, tubular composite article having a diameter of 0.5 to 3.0 mm that is useful as a stent, hypodermic needle or blood collection tube comprising the steps of:
    a. Placing a polytetrafluoroethylene coated copper wire mandrel having a diameter of 0.5 to 3.0 mm on a bottom platen;
    b. Applying an effective amount of tension by a tensioning means for providing linearity to the mandrel along its longitudinal axis;
    c. Securing said tensioned mandrel to the bottom platen;
    d. Contacting one long edge of a pre-sized parallelogram-shaped prepreg strip along the length of said tensioned mandrel leaving an unattached portion, wherein said prepreg strip comprises graphite fibers oriented longitudinally within a polymer matrix consisting of an epoxy resin-curing agent mixture;
    e. Positioning a moveable top platen in contact with and normal to the prepreg strip;
    f. Releasing the tension on the mandrel;
    g. Activating said top platen to move horizontally across the bottom platen with effective pressure to rotate and wrap the unattached portion of prepreg strip;
    h. Removing the top platen from the prepreg wrapped mandrel;
    i Releasing the tension on said mandrel;
    j. Covering the prepreg coated mandrel with a compression sleeve of heat shrinkable polyethylene;
    k. Heating to shrink said sleeve to effect compression and consolidation of said prepreg to form an assembly;
    l. Applying an effective degree to tension for maintaining the linearity of said assembly to said mandrel;
    m. Maintaining said tension and curing the prepreg to form a tubular composite around said mandrel;
    n. Releasing the tension on said mandrel;
    o. Withdrawing said mandrel from the tubular composite; and
    p. Removing the compression sleeve to yield said linear composite tubular article.

* * * * *